United States Patent
Kontz et al.

(10) Patent No.: US 8,874,346 B2
(45) Date of Patent: Oct. 28, 2014

(54) SYSTEM WITH BLENDED ANTI-LOCK AND STABILITY CONTROL

(71) Applicant: Caterpillar Inc., Peoria, IL (US)

(72) Inventors: Matthew Edward Kontz, Chillicothe, IL (US); Brad Allen Edler, Waterloo, IL (US); Jeffrey Lee Kuehn, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 78 days.

(21) Appl. No.: 13/677,895

(22) Filed: Nov. 15, 2012

(65) Prior Publication Data
US 2014/0136071 A1    May 15, 2014

(51) Int. Cl.
*B60T 8/176* (2006.01)
*B60T 8/17* (2006.01)

(52) U.S. Cl.
CPC .. *B60T 8/176* (2013.01); *B60T 8/17* (2013.01)
USPC ............. 701/71; 701/30.3; 701/30.1; 701/78; 701/76

(58) Field of Classification Search
USPC .............................. 701/71, 30.3, 30.1, 78, 76
See application file for complete search history.

(56) References Cited

U.S. PATENT DOCUMENTS

| | | | | |
|---|---|---|---|---|
| 4,180,223 A | * | 12/1979 | Amberg | 244/111 |
| 5,075,859 A | * | 12/1991 | Mayr-Frohlich et al. | 701/78 |
| 5,671,143 A | | 9/1997 | Gräber | |
| 5,704,696 A | * | 1/1998 | Monzaki | 303/146 |
| 5,967,624 A | * | 10/1999 | Graber et al. | 303/113.4 |
| 6,201,997 B1 | * | 3/2001 | Giers | 700/79 |
| 6,318,820 B1 | * | 11/2001 | Usukura | 303/149 |
| 6,370,467 B1 | * | 4/2002 | Kimbrough | 701/71 |
| 6,409,287 B1 | | 6/2002 | Leach et al. | |
| 6,435,627 B1 | * | 8/2002 | Roll et al. | 303/173 |
| 6,778,867 B1 | * | 8/2004 | Ziegler et al. | 700/79 |
| 6,842,683 B2 | * | 1/2005 | Kim | 701/70 |
| 7,165,644 B2 | * | 1/2007 | Offerle et al. | 180/244 |
| 7,349,776 B2 | | 3/2008 | Spillane et al. | |
| 7,359,786 B2 | * | 4/2008 | Lindqvist | 701/70 |
| 7,620,465 B2 | * | 11/2009 | Degoul et al. | 700/82 |
| 7,661,772 B2 | * | 2/2010 | Heinemann | 303/146 |

(Continued)

FOREIGN PATENT DOCUMENTS

| | | |
|---|---|---|
| EP | 2 208 651 A1 | 7/2010 |
| FR | 2 841 200 A1 | 12/2003 |
| GB | 2 414 525 A1 | 11/2005 |
| WO | WO 2008063120 A1 * | 5/2008 |

*Primary Examiner* — James Trammell
*Assistant Examiner* — Michael Berns
(74) *Attorney, Agent, or Firm* — Finnegan, Henderson, Farabow, Garrett & Dunner LLP

(57) ABSTRACT

A brake system for a mobile machine is disclosed. The brake system may have an anti-lock braking subsystem configured to calculate a maximum allowable brake command. The brake system may have a stability control subsystem configured to generate a desired differential brake command. The brake system may have a brake command adjustment subsystem. The brake command adjustment subsystem may be configured to calculate an ideal solution of a left brake command and a right brake command to satisfy a combination of the desired differential brake command and a desired total brake command. When the ideal solution is valid, the brake command adjustment subsystem may output the ideal solution as an actual brake command. When the ideal solution is invalid, the brake command adjustment subsystem may calculate a non-ideal solution of the left brake command and the right brake command.

20 Claims, 3 Drawing Sheets

(56) References Cited

U.S. PATENT DOCUMENTS

| | | |
|---|---|---|
| 7,703,571 B2 | 4/2010 | Riepold et al. |
| 7,887,144 B2 | 2/2011 | Braschel |
| 8,073,607 B2 * | 12/2011 | Sidlosky et al. ............... 701/82 |
| 8,326,496 B2 * | 12/2012 | Yasutake et al. ............... 701/48 |
| 8,494,708 B2 * | 7/2013 | Bechtler et al. ............... 701/30.3 |
| 8,548,708 B2 * | 10/2013 | Strengert et al. ............... 701/70 |
| 2004/0167701 A1 * | 8/2004 | Mattson et al. ............... 701/71 |
| 2009/0192676 A1 | 7/2009 | Sidlosky et al. |
| 2010/0204894 A1 * | 8/2010 | Strengert et al. ............... 701/70 |
| 2010/0211271 A1 | 8/2010 | Yasutake et al. |
| 2011/0066321 A1 * | 3/2011 | Bechtler et al. ............... 701/34 |

* cited by examiner

SYSTEM WITH BLENDED ANTI-LOCK AND STABILITY CONTROL

TECHNICAL FIELD

The present disclosure relates to a brake system and, more particularly, to a brake system that blends anti-lock braking system (ABS) and dynamic stability control (DSC) brake commands.

BACKGROUND

Most mobile machines are equipped with some kind of brake system that can be used to slow the machines in response to operator input. Typical brake systems implement various control strategies, which adjust the braking applied to a wheel of a machine when underfoot conditions necessitate the adjustments. Two of these control strategies are known as anti-lock braking system (ABS) and dynamic stability control (DSC).

ABS is a control strategy that tries to reduce wheel slip during braking in order to improve the ability to steer the machine. In some cases, ABS can improve stopping distance or braking ability, but the primary goal is to improve steering control by reducing slip. When ABS is active, it will decrease braking torque on the wheel when it senses the wheel beginning to lose too much rotation (to slip) in relation to the other wheels of the machine or the moving ground below.

DSC detects an actual yaw-rate (turning) of the machine, a desired yaw-rate (steering), and estimated machine slide-slip. When these rates differ due to poor underfoot conditions, DSC attempts to correct for the difference by appropriately applying braking force to one or more of the wheels. Braking forces are applied to individual wheels asymmetrically in order to create torque about the machine's vertical axis and help the machine track the desired yaw-rate, despite side slip.

ABS and DSC can both improve machine control and stability, and the two in combination may or may not be conflicting. ABS must take into account maximum limits of brake forces happening on both sides of the machine, while DSC must manage the difference between brake forces acting on each side of the machine. Sometimes ABS will set upper limits on the braking force to prevent locking of the wheels. Sometimes DSC will determine an optimal braking force that is not within the limits set by ABS.

An exemplary brake system having a vehicle dynamic control system including ABS to stabilize cornering movement of a vehicle is disclosed in U.S. Application No. EP 2208651 issued to Semsey on Jul. 21, 2010 (the '651 application"). Specifically, the '651 application discloses a system that calculates an acceleration vector of a cornering vehicle based on measurements of longitudinal and lateral components of acceleration, while the ABS modifies at least three wheel brake forces. The system determines whether this corner acceleration falls within a forbidden range of acceleration vectors, which causes side slip and instability of the vehicle. If the acceleration falls within the forbidden range, and requires adjustment, the system applies a brake force or slip to the outer front wheel to bring the vehicle acceleration into an acceptable state.

While the system of the '651 patent may provide desired braking for cornering stability during ABS activation, the system does not discuss DSC brake commands. Furthermore, the '651 patent does not discuss how to handle a situation in which DSC brake commands conflict with concurrent ABS commands.

The present disclosure is directed to overcoming one or more of the problems set forth above and/or other problems of the prior art.

SUMMARY

In one aspect, the present disclosure is directed to a brake system for a mobile machine. The brake system may include an anti-lock braking subsystem configured to calculate a maximum allowable brake command, and a stability control subsystem configured to generate a desired differential brake command. The brake system may also include a brake command adjustment subsystem. The brake command adjustment subsystem may be configured to calculate an ideal solution of a left brake command and a right brake command to satisfy a combination of the desired differential brake command and a desired total brake command. When the ideal solution is valid, the brake command adjustment subsystem may output the ideal solution as an actual brake command. When the ideal solution is invalid, the brake command adjustment subsystem may calculate a non-ideal solution of the left brake command and the right brake command.

In another aspect, the present disclosure is directed to a method of braking a mobile machine. The method may include receiving a maximum allowable brake command and a desired differential brake command. The method may also include calculating an ideal solution of a left brake command and a right brake command to satisfy a combination of the desired differential brake command and a desired total brake command. When the ideal solution is valid, the method includes outputting the ideal solution as an actual brake command. When the ideal solution is invalid, the method includes calculating a non-ideal solution of the left brake command and the right brake command.

DETAILED DESCRIPTION

Figure 1:
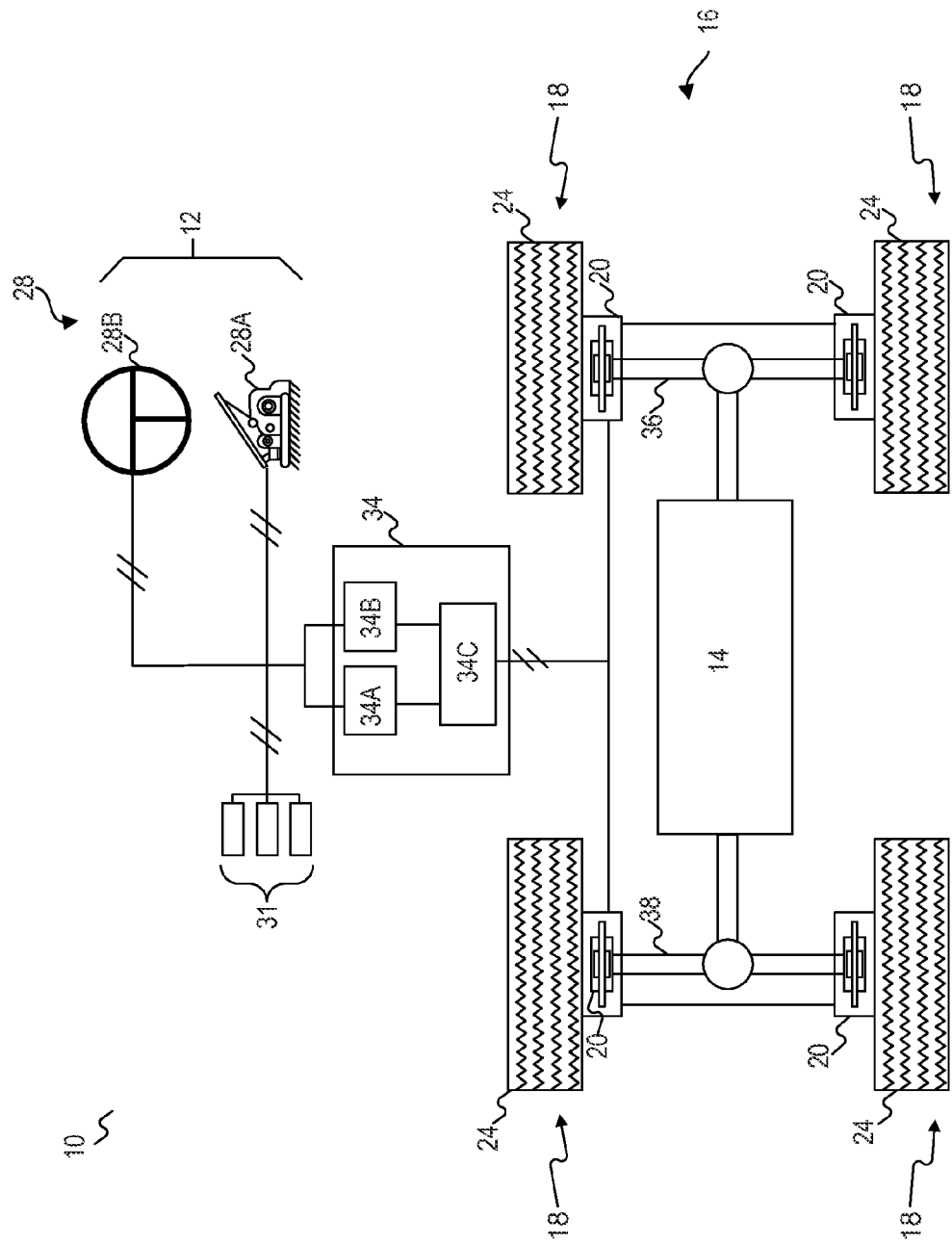
FIG. 1 is a pictorial illustration of a machine having an exemplary disclosed brake system.

FIG. 1 illustrates an exemplary mobile machine 10. Machine 10 may be a hauling machine such as off-highway haul truck, a scraper, an on-highway vocational truck, a wheel loader, a passenger vehicle, or any other operation-performing machine. Machine 10 may include an operator station 12 operably connected to a power source 14 and a brake system 16.

Operator station 12 may be configured to receive input from a machine operator indicative of a desired acceleration, deceleration, and/or steering of machine 10. In particular, operator station 12 may include one or more operator input devices 28 located proximate an operator seat (not shown) that are configured to generate control signals associated with desired braking, accelerating, and steering operations of machine 10. For example, a first operator input device 28A is shown as a pedal that is movable from a neutral position through a range to a maximum displaced position to generate a corresponding braking signal indicative of a desired deceleration of machine 10. The braking signal may have a value substantially proportional to the displacement position of first operator input device 28A. The signal generated by first input device 28A may be directed to a controller 34 for further processing. A second operator input device 28B is shown as a steering device, such as a steering wheel, that is manipulated by an operator of machine 10 to generate a desired direction of steering signal or desired steering angle signal. The signal generated by second input device 28B may also be directed to controller 34 for further processing. It is contemplated that operator input devices 28 may be devices other than a pedal and a steering wheel, for example a joystick, a lever, a handle, a push button, a switch, or any other device known in the art. In some embodiments, operator input devices 28 may include an accelerator pedal, clutch pedal, gear stick, as well as other known input devices. It is contemplated that in some embodiments, inputs may originate from control systems instead of directly from an operator. Any control system that sends signals to adjust the operation of machine 10 may be considered. For example, in one embodiment, an Automatic Retarding Control (ARC) may send a brake command while machine 10 is going down a grade to limit engine speed. For purposes of this disclosure, it is contemplated that the methods and systems disclosed may function interchangeably with operator input devices 28 or with control systems that generate signals that adjust the operation of machine 10.

Power source 14 may include, for example, a combustion engine that drives one or more traction devices 18 and that provides electrical and hydraulic power to the various components of machine 10. Traction devices 18 may include wheels 24 located on each side of machine 10. Alternatively, traction devices 18 may include tracks, belts, or other driven traction devices. One or all of traction devices 18 may be powered to propel machine 10 and/or steered in accordance with commands issued from operator station 12.

Brake system 16 may include a plurality of brake mechanisms 20. Brake mechanisms 20 may be configured to retard the motion of machine 10 and may be operably associated with each traction device 18 of machine 10. In one embodiment, brake mechanism 20 is a hydraulic pressure-actuated wheel brake such as, for example a disk brake or a drum brake. In other embodiments, brake mechanisms may be wet brakes, dry brakes, single-disk brakes, multi-disk brakes, and any other brake mechanisms known in the art. When a command is directed to brake mechanism 20, brake mechanism 20 may activate (e.g. engage the disk or drum) to generate a reverse torque that retards the motion of the associated traction device 18. These commands may be directed independently to each brake mechanism 20 or together to all brake mechanisms 20, as desired. It is contemplated that brake mechanism 20 may alternatively embody another non-hydraulic type of wheel brake, such as an electric motor or any other similar mechanism known in the art. The brake commands may be received from controller 34 electronically, hydraulically, pneumatically, or in any other manner.

Controller 34 may include interfaces that receive signals from various input and sensor devices, e.g. from 28A, 28B, and/or one or more movement sensors 31. Movement sensors 31 may be, for example, wheel rotation-speed sensors, IMUs, GPS tracking devices, or ground radars. Sensor inputs may include, among other things, wheel speeds, forward speed, forward acceleration, lateral acceleration, and yaw-rate. Movement sensors 31 may be located at or near a center of gravity of machine 10 and/or located near wheels 24.

Controller 34 may also include an anti-lock braking subsystem 34A, a stability control subsystem 34B, and/or a brake command adjustment subsystem 34C. In some embodiments, anti-lock braking subsystem 34A may be an ABS subsystem and stability control subsystem 34B may be a DSC subsystem. In the exemplary embodiment shown in FIG. 1, subsystems 34A, 34B, and 34C can be located within controller 34. However, in various embodiments, subsystems 34A, 34B, and 34C may be located separately from controller 34. In these embodiments, controller 34 may include interfaces that receive signals from subsystems 34A, 34B, and 34C.

Anti-lock braking subsystem 34A may receive a braking signal from operator input device 28A, and signals, such as wheel and ground speeds, from movement sensors 31, and/or signals from other types of sensors known in the art, such as ground friction sensors (not shown), which sense the ground's frictional coefficient. When anti-lock braking subsystem 34A senses that a wheel 24 is beginning to lose too much rotation in relation to the other wheels 24 of machine 10 or the moving ground below, anti-lock braking subsystem 34A may attempt to decrease the braking torque applied the wheel 24 by brake mechanism 20.

When a wheel 24 decelerates more quickly than machine 10 is capable of, machine 10 will continue to move forward faster than the speed at which wheel 24 is rotating. Therefore, undesired skidding of wheel 24 will occur, resulting in reduction of control over machine 10. The rate at which machine 10 may be able to decelerate is determined at least by underfoot conditions of the ground surface being traversed by machine 10. For instance, the friction provided by the ground surface may depend on whether the ground surface is slippery (e.g., ice) or non-slippery (e.g., dry pavement). When the ground surface is slippery, machine 10 may not be able to decelerate as quickly as when the ground surface is non-slippery. When machine 10 is not able to decelerate quickly, a lower maximum allowable brake command can be applied before wheel 24 begins to experience undesirable skidding, compared to when machine 10 is able to decelerate quickly.

In some embodiments, anti-lock braking subsystem 34A may determine a maximum allowable brake command based on the conditions of the ground surface via a ground friction sensor. In other embodiments, anti-lock braking subsystem 34A may determine a maximum allowable brake command based on other methods known in the art. The maximum allowable brake command is calculated such that, when it is applied to wheel 24, the deceleration of machine 10 does not exceed the deceleration of wheel 24 by more than a threshold amount. In this way, the maximum allowable brake command is the maximum brake command that can be applied to brake mechanisms 20 before undesired slipping of wheels 24 occur.

Stability control subsystem 34B may receive an actual yaw-rate (i.e., turning rate) and a desired yaw-rate (i.e., steering rate) of machine 10 from movement sensors 31 and operator input devices 28, respectively. Desired yaw-rate may be determined from an effective steering angle (based on a signal from steering device 28B), wheel speeds (as measured by movement sensors 31), longitudinal (forward) acceleration (as measured by movement sensors 31), and actual yaw-rate (as measured by movement sensors 31). Desired yaw-rate may be calculated using the following equation (1):

$$\dot{\psi}_{des} = \frac{\tan(\theta) \cdot v}{d_{wb} + k \cdot v^2} \quad (1)$$

where $\dot{\psi}_{des}$ is the desired yaw-rate, $\theta$ is the steering angle, v is the forward velocity estimated from measured wheel speeds, forward acceleration, and actual yaw-rate, $d_{wb}$ is the distance from front axle 36 to rear axle 38 (the wheelbase), and k is a nominal understeer gradient coefficient.

Stability control subsystem 34B may attempt to correct for a difference between actual yaw-rate and desired yaw rate by applying brake forces to one or more of wheels 24. The brake forces may be applied to individual wheels 24 asymmetrically, thereby creating a torque about the center of gravity of machine 10. Stability control subsystem 34B may determine the desired differential brake command by calculating a control moment needed to help machine 10 track the steering command. The control moment may be calculated by applying a proportional-derivative (PD) control to an error between the actual yaw-rate and the desired yaw-rate. Depending on whether machine 10 is experiencing understeer (machine rotates less than an amount commanded by steering device 28B) or oversteer (machine rotates more than the amount commanded), stability control subsystem 34B may apply the differential brake force to either a front set of brake mechanisms 20 associated with front wheels 24, or a back set of brake mechanisms 20 associated with back wheels 24. Stability control subsystem 34B may use rear brake mechanisms 20 if understeer is occurring. Stability control subsystem 34B may use front brake mechanisms 20 if oversteer is occurring.

In various embodiments, the desired total brake command from anti-lock braking subsystem 34A and the desired differential brake command from stability control subsystem 34B may be output to brake command adjustment subsystem 34C for further processing, as will be described in more detail below. Brake command adjustment subsystem 34C may be configured to receive signals from anti-lock braking subsystem 34A and stability control subsystem 34B, and execute instructions stored on a computer readable medium to perform a method of braking control in response to the signals. Brake command adjustment subsystem 34C may include any component or combination of components for monitoring, recording, storing, indexing, processing, and/or communicating operational aspects of machine 10 described above. These components may include, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from types of computer program products or non-transitory computer-readable media, such as computer chips and secondary storage devices, including hard disks, floppy disks, optical media, CD-ROM, or other forms of RAM or ROM. Brake command adjustment subsystem 34C may execute sequences of computer program instructions stored on the computer readable media to perform methods of braking control that will be explained below.

Figure 2:
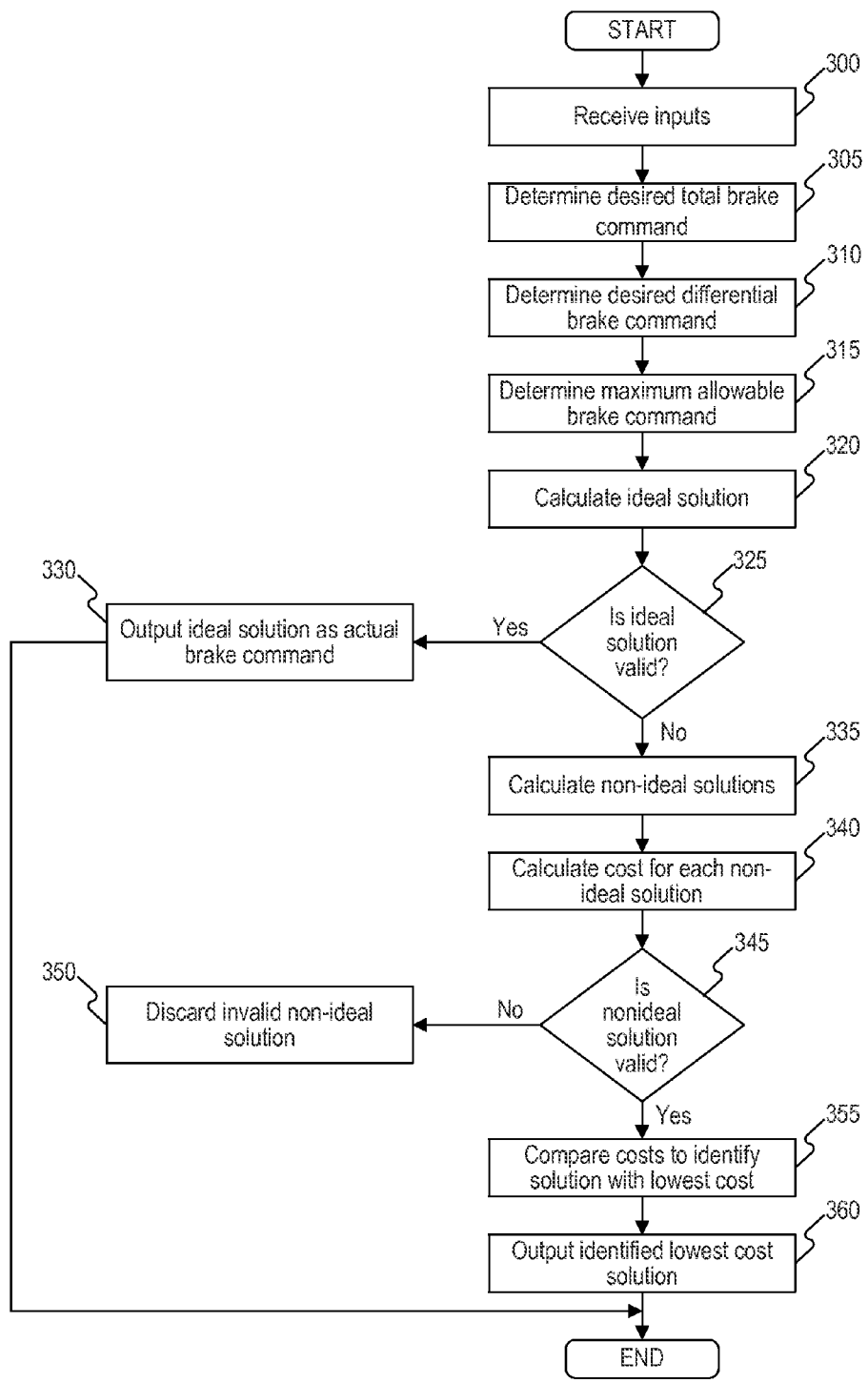
FIG. 2 is a flowchart depicting an exemplary disclosed method of operating the brake system of FIG. 1.
Figure 3:
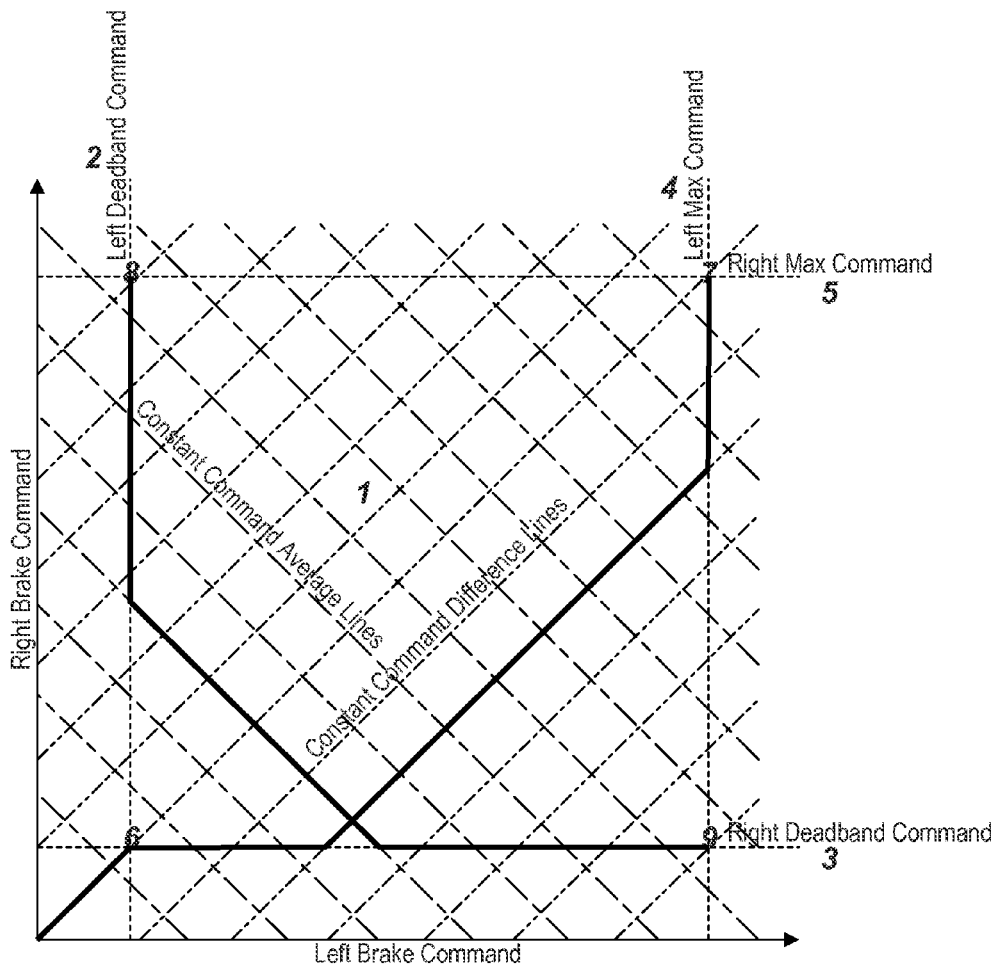
FIG. 3 is a graphical representation of the exemplary method of FIG. 3.

After brake command adjustment subsystem 34C has determined brake commands according to methods consistent with the disclosure, the brake commands may be output to brake mechanisms 20. FIG. 2 and FIG. 3 illustrate an exemplary method stored as instructions on the computer readable medium that are executable by brake command adjustment subsystem 34C to perform braking control of machine 10. FIGS. 2 and 3 will be discussed in more detail in the following section to further illustrate the disclosed concepts.

INDUSTRIAL APPLICABILITY

The disclosed brake system may be applicable to any mobile machine where simultaneous anti-lock braking and dynamic stability control are desired. The disclosed brake system may provide for these needs through use of an optimization method described herein. The disclosed brake system may utilize four-corner braking, where the control system may actively control each brake mechanism 20 individually, and may control one of a front or back set of brake mechanisms 20 at a time. The method may be performed by brake command adjustment subsystem 34C of controller 34. Operation of brake system 16 will now be explained with respect to FIGS. 2 and 3.

The exemplary method of braking machine 10 may begin with controller 34 receiving signal inputs from operator input devices 28 and movement sensors 31 (Step 300). These signals may include operator brake commands, operator acceleration commands, steering direction or angle, measured forward speed, measured forward acceleration, measured lateral speed, measured lateral acceleration, measured yaw-rate, and wheel speeds. Based on these signals, brake command adjustment subsystem 34C may determine a desired total brake command (Step 305), a desired differential brake command (Step 310), and a maximum allowable brake command (Step 315). The desired total brake command is a value proportional to the braking signal from the operator by, for example, operator input device 28A. The desired differential brake command is a difference between a brake command applied to a left brake mechanism 20 and a brake command applied to a right brake mechanism 20, and is proportional to the control moment needed to help machine 10 track the steering command, as determined by stability control subsystem 34B. The maximum allowable brake command is the maximum brake command, as determined by the anti-lock braking subsystem 34A, that can be applied to brake mechanisms 20 before undesired slipping of wheels 24 occur.

Based on the desired differential brake command and the desired total brake command, brake command adjustment subsystem 34C may calculate an ideal solution of brake commands for left and right brake mechanisms 20. An ideal solution of brake commands is a solution which allows for both the desired differential brake command and the desired total brake command to be fully met. Brake command adjustment subsystem 34C may calculate an ideal solution according to, for example, Equation (2) and Equation (3) below (Step 320).

$$R_C = R_D - \frac{D}{2} \qquad (2)$$

$$L_C = L_D + \frac{D}{2} \qquad (3)$$

In Equation (2) and Equation (3), $R_D$ is a desired right brake command, $L_D$ is a desired left brake command, $R_C$ is an actual right brake command, $L_C$ is an actual left brake command, and D is the desired differential brake command determined in Step 310. The desired brake commands $R_D$ and $L_D$ are determined based on the desired total brake command received from the operator input devices 28. In some embodiments, $R_D$ and $L_D$ are the same value and each equal to half of the desired total brake command. The actual brake commands $R_C$ and $L_C$ are the brake commands that will eventually be sent to brake mechanisms 20.

Brake command adjustment subsystem 34C may check whether the ideal brake commands calculated in Step 320 are valid solutions (Step 325). Checking the validity of the calculated brake commands may include comparing bounds set by a predetermined minimum deadband limit and the maximum allowable brake command as determined by anti-lock braking subsystem 34A. The minimum deadband limit is a value used to help ensure that brake mechanism 20 does not completely shut off. Preventing brake mechanism 20 from completely shutting off, even if a desired brake command is zero, reduces a response delay for a subsequent non-zero brake command. This is due to the fact that in some embodiments of machine 10, it takes a finite amount of time to activate brake mechanisms 20. Having brake mechanisms 20 always activated at some level bypasses this activation time delay when brake mechanisms 20 are given a command to engage. When the solutions determined by Equations (2) and (3) fall within the boundaries defined by these limits, set by the minimum deadband limit and the maximum allowable brake command determined by anti-lock brake subsystem 34A, brake command adjustment subsystem 34C may output the ideal brake commands calculated in Step 320 to brake mechanisms 20 as the actual brake command (Step 330). Otherwise, brake command adjustment subsystem 34C may calculate non-ideal solutions of left and right brake forces at boundary conditions, using, for example, Equation (4) and Equation (5) (Step 335).

$$R_C = \frac{C \cdot (L_D + R_D) - D - L_C(C-1) + R_D - L_D}{1+C} \quad (4)$$

$$L_C = \frac{C \cdot (L_D + R_D) + D + L_D + R_C(1-C) - R_D}{1+C} \quad (5)$$

Non-ideal solutions may be considered non-ideal because at least one of the differential brake command and total command may not be fully satisfied.

There may be eight possible non-ideal solutions of left and right brake forces, which are discussed in further details below in relation to FIG. 3. Once these non-ideal solutions are calculated, brake command adjustment subsystem 34C may calculate an associated cost for each non-ideal solution (Step 340). This cost is a calculation reflecting how much a non-ideal solution falls short of the ideal solution. The cost calculation may be calculated according to Equation (6) below.

$$\text{cost} = C \cdot ((L_D + R_D) - (L_C + R_C))^2 + (D + (L_D - R_D) - (L_C - R_C)) \quad (6)$$

The cost may have two different parts. The first part of the cost, $C \cdot ((L_D + R_D) - (L_C + R_C))^2$, reflects a penalization of the solution when the sum of the left and right brake commands do not match the desired total brake command. The second part, $(D + (L_D - R_D) - (L_C - R_C))$, reflects a penalization when the difference in the left and right brake commands of the solution do not match the desired brake differential brake command. In some embodiments, C is a brake weight term that increases the importance of the desired total brake command as the original operator brake command increases in magnitude. That is, a preference is given to penalizing the solution if the desired total brake command is not met when the operator is requesting a large desired total brake command. This may be important, for example, in an event where the most important request is a hard brake, in order that machine 10 may avoid an accident of running into something else. This brake weight may be calculated using a map, where the input is the original brake command from operator input devices 28. The map may be a linear relationship between the input brake command and the brake weight term, such that the larger the brake command is, the larger the brake weight term is, in proportion. The map may be nonlinear, if desired. In some embodiments, the brake weight may be based on parameters other than total brake command, e.g., machine speed, actual yaw-rate, desired yaw-rate, steering angle, or machine acceleration.

Brake command adjustment subsystem 34C may then check the validity of each non-ideal solution (Step 345). In some embodiments, a non-ideal solution is determined to be invalid if it fails to exist within the boundaries imposed by the limits of the deadband minimum and the maximum allowable brake command of anti-lock braking subsystem 34A. In other embodiments, a non-ideal solution is determined to be invalid when the cost of the non-ideal solution is above a maximum theoretical cost. When the non-ideal solution is invalid, brake command adjustment subsystem 34C may mark the non-ideal solution as invalid and/or discard the invalid non-ideal solution (Step 350). On the other hand, for the non-ideal solutions that are valid, brake command adjustment subsystem 34C may compare the costs associated with the valid, non-ideal solutions to identify the solution with the lowest cost (Step 355). Brake command adjustment subsystem 34C may output the valid, non-ideal solution with the smallest cost as the actual brake command (Step 360). The actual brake command may then be directed to brake mechanisms 20, resulting in application of the left and right brake forces.

FIG. 3 depicts a graph related to the method of FIG. 2. The horizontal axis represents left brake commands, and the vertical axis represents right brake commands. A minimum limit to the left brake command, as set by the minimum deadband limit described above, is indicated by the line labeled "Left Deadband Command", and a maximum limit to the left brake command, as set by the maximum allowable brake command determined by anti-lock braking subsystem 34A, is indicated by the line labeled "Left Max Command". The valid range of left brake commands is between these two limits, and inclusive of these limits. In some embodiments, if a desired left brake command, based on either the desired total brake command from operator input devices 28 or desired differential brake command from stability control subsystem 34B, is smaller than the minimum limit, brake command adjustment subsystem 34C may reset the desired left brake command to the value of the minimum limit. If a desired left brake command is larger than the maximum limit, brake command adjustment subsystem 34C may reset the desired left brake command to the value of the maximum limit.

Similarly, a minimum limit to the right brake command, as set by the minimum deadband limit described above, is indicated by the line labeled "Right Deadband Command", and a maximum limit to the right brake command, as set by the maximum allowable brake command determined by anti-lock braking subsystem 34A, is indicated by the line labeled "Right Max Command". The valid range of right brake commands is between these two limits, and inclusive of these limits. If a desired right brake command is smaller than the minimum limit, brake adjustment subsystem 34C may reset the desired right brake command to the value of the minimum limit. If a desired right brake command is larger than the maximum limit, brake adjustment subsystem 34C may reset the desired right brake command to the value of the maximum limit.

The area defined by the four corners (labeled as 6, 7, 8, and 9 in FIG. 3) that correspond to combinations of minimum and maximum left and right brake commands, is the space of valid solutions of left and brake commands. When a solution is found within this valid space, and is not at a boundary, the solution is an ideal solution because both the desired differential brake command and the desired total brake command are fully satisfied. The ideal solution has zero cost associated with it, since both the original differential brake command, as output by stability control subsystem 34B, and the desired total brake command, as output by operator input devices 28, are fully met. However, when the solution is valid but is at a boundary, there may be a cost associated with the solution, since at least one of the differential brake command and total command may not be fully satisfied. That is, one of the brake commands of an ideal solution may fall outside the boundaries set by the limits, and may need to be adjusted so that it has a value within the limits, turning the ideal solution to a non-ideal solution.

FIG. 3 also shows that along lines of constant positive slope are constant command difference lines, corresponding to desired differential brake commands, and along lines of constant negative slope are constant command average lines, corresponding to desired total brake commands. Where a constant command difference line, corresponding to a particular desired differential brake command, and a constant command average line, corresponding to a particular desired total brake command, intersect, there exists a solution to the braking optimization problem that seeks to implement the desired differential brake command and desired total brake command simultaneously. If this intersection occurs outside the bounds set by the minimum and maximum allowable brake command limits, a lowest-cost non-ideal solution that occurs at the boundaries may need to be found.

Eight possible non-ideal solutions exist, as depicted in the graph of FIG. 3. The first possible solution occurs when the left brake command $L_C$ is at the lower limit, as set by the minimum deadband limit, and right brake command $R_C$ is calculated according to Equation (4). This first non-ideal solution will lie somewhere along vertical line 2, labeled "Left Deadband Command". In situations when the first non-ideal solution lies above point 8 or below point 6 along vertical line 2, the solution is invalid because the right brake command $R_C$ is above the maximum allowable brake command or below the minimum deadband limit, respectively.

The second possible solution occurs when the right brake is at the lower limit, as set by the minimum deadband limit, and the left brake command $L_C$ is calculated according to Equation (5). This second non-ideal solution will lie somewhere along horizontal line 3 of the graph, labeled "Right Deadband Command". In situations when the second non-ideal solution lies to the right of point 9 or to the left of point 6 along horizontal line 3, the solution is invalid because the left brake command $L_C$ is above the maximum allowable brake command or below the minimum deadband limit, respectively.

The third possible solution occurs when the left brake command $L_C$ is at the maximum limit, as set by anti-lock braking subsystem 34A, and the right brake command $R_C$ is calculated according to Equation (4). This third non-ideal solution will lie somewhere along vertical line 4, labeled "Left Max Command". In situations when the third non-ideal solution lies above point 7 or below point 9 along vertical line 4, the solution is invalid because the right brake command $R_C$ is above the maximum allowable brake command or below the minimum deadband limit, respectively.

The fourth possible solution occurs when the right brake command $R_C$ is at the maximum, as set by anti-lock braking subsystem 34A, and the left brake command $L_C$ is calculated according to Equation (5). This fourth non-ideal solution will lie somewhere along horizontal line 5, labeled "Right Max Command". In situations when the second non-ideal solution lies to the right of point 7 or to the left of point 8 along horizontal line 5, the solution is invalid because the left brake command $L_C$ is above the maximum allowable brake command or below the minimum deadband limit, respectively.

The fifth possible solution occurs when both brake commands are at their minimum limits, as set by the minimum deadband limit. This fifth non-ideal solution lies at point 6.

The sixth possible solution occurs when both brake commands are at their maximums, as set by anti-lock braking subsystem 34A. This sixth non-ideal solution lies at point 7.

The seventh possible solution occurs when the left brake command is at a minimum, as set by the minimum deadband limit, and the right brake command is at a maximum, as set by anti-lock braking subsystem 34A. This seventh non-ideal solution lies at point 8.

The eighth possible solution occurs when the right brake command is at a minimum, as set by the minimum deadband limit, and the left brake command may be at a maximum, as set by anti-lock braking subsystem 34A. This eighth non-ideal solution lies at point 9.

One example of solving simultaneously for left and right brake commands for given desired differential brake commands and desired total brake commands is shown in the graph of FIG. 3. A line marking all possible left and right brake commands for a given desired total brake command is drawn, which starts at point 8, follows partway down the "Left Deadband Command" line, slopes away from the "Left Deadband Command" line to the "Right Deadband Command" line, follows the "Right Deadband Command" line to end at point 9. The vertical portion of this line indicates where the left brake command has hit the minimum limit, and therefore can only be set to the value of the minimum limit, even if the minimum limit does not satisfy the desired total brake command. This portion corresponds to non-ideal brake commands because the desired total brake command is not satisfied, since the left brake command cannot be set low enough.

The slanting portion of the line that follows a constant command average line indicates where the left and right brake commands are ideal in providing the desired total brake command. The horizontal portion of this line indicates where the right brake command has hit the minimum limit, and therefore can only be set to the value of the minimum limit, even if the minimum limit does not satisfy the desired total brake command. This portion corresponds to non-ideal brake commands because the desired total brake command is not satisfied, since the right brake command cannot be set low enough.

A line marking all possible left and right brake commands for a given desired differential brake command is also drawn, which starts at point 6, follows partway across "Right Deadband Command" line, slopes away from the "Right Deadband Command" line to the "Left Max Command" line, and follows the "Left Max Command" line to end at point 7. The horizontal portion of this line indicates where the right brake command has hit the minimum limit, and therefore can only be set to the value of the minimum limit, even if the minimum limit does not satisfy the desired differential brake command. This portion corresponds to non-ideal brake commands because the desired differential brake command is not satisfied, since the right brake command cannot be set low enough.

The slanting portion of the line that follows a constant command difference line indicates where the left and right brake commands are ideal in providing the desired differential brake command. The vertical portion of this line indicates where the left brake command has hit the maximum limit, and therefore can only be set to the value of the maximum limit, even if the maximum limit does not satisfy the desired differential brake command. This portion corresponds to non-ideal brake commands because the desired differential brake command is not satisfied, since the left brake command cannot be set high enough.

In the example discussed above, the lines corresponding to the desired total brake command and the desired differential brake command intersect at a point which lies within the boundaries set by the limits. The left and right brake commands corresponding to this point of intersection provide a solution to the braking optimization problem, which is then output as actual brake commands. Because the brake commands are not affected by any of the boundary limits and correspond to brake commands that fully satisfy the desired differential brake command the desired total brake command, they form an ideal solution. If the lines did not intersect within the boundaries set by the limits, the non-ideal solutions, as discussed, above would be calculated, and the non-ideal solution with the lowest cost would be output as the actual brake commands.

It will be apparent to those skilled in the art that various modifications and variations can be made to the disclosed brake system. Other embodiments will be apparent to those skilled in the art from consideration of the specification and practice of the disclosed brake system. It is intended that the specification and examples be considered as exemplary only, with a true scope being indicated by the following claims and their equivalents.

The invention claimed is:

1. A brake system for a mobile machine, comprising:
    an anti-lock braking subsystem configured to calculate a maximum allowable brake command;
    a stability control subsystem configured to generate a desired differential brake command; and
    a brake command adjustment subsystem configured to:
        calculate an ideal solution of a left brake command and a right brake command to satisfy a combination of the desired differential brake command and a desired total brake command;
        output the ideal solution as an actual brake command when the ideal solution is valid; and
        calculate a non-ideal solution of the left brake command and the right brake command when the ideal solution is invalid.

2. The brake system of claim 1, wherein the desired total brake command is determined by a signal from an operator input device.

3. The brake system of claim 1, wherein the ideal solution is valid when the left brake command and the right brake command are less than or equal to the maximum allowable brake command and more than or equal to a minimum brake command.

4. The brake system of claim 1, wherein the non-ideal solution is one of eight non-ideal solutions, wherein
    in a first non-ideal solution, the left brake command equals a minimum brake command and the right brake command is calculated;
    in a second non-ideal solution, the right brake command equals the minimum brake command and the left brake command is calculated;
    in a third non-ideal solution, the left brake command equals the maximum allowable brake command and the right brake command is calculated;
    in a fourth non-ideal solution, the right brake command equals the maximum allowable brake command and the left brake command is calculated;
    in a fifth non-ideal solution, the left brake command equals the minimum brake command and the right brake command equals the minimum brake command;
    in a sixth non-ideal solution, the left brake command equals the maximum allowable brake command and the right brake command equals the maximum allowable brake command;
    in a seventh non-ideal solution, the left brake command equals the minimum brake command and the right brake command equals the maximum allowable brake command; and
    in an eighth non-ideal solution, the left brake command equals the maximum allowable brake command and the right brake command equals the minimum brake command.

5. The brake system of claim 4, wherein the minimum brake command is set by a minimum deadband limit.

6. The brake system of claim 4, wherein the brake command adjustment subsystem is further configured to calculate a cost associated with each of the eight non-ideal solutions.

7. The brake system of claim 4, wherein the brake command adjustment subsystem is further configured to determine whether any of the eight non-ideal solutions are invalid, wherein any of the eight non-ideal solutions are invalid if at least one of the left brake command and the right brake command falls outside of a range set by the minimum brake command and the maximum allowable brake command.

8. The brake system of claim 7, wherein the brake command adjustment subsystem is further configured to output the valid non-ideal solution having a lowest cost as the actual brake command.

9. The brake system of claim 1, wherein the brake command adjustment subsystem is further configured to calculate a cost associated with the non-ideal solution.

10. The brake system of claim 9, wherein calculation of the cost includes calculating a penalty for when a difference in left and right brake commands deviates from the desired differential brake command and calculating a penalty for when a sum of the left brake command and the right brake command deviates from the desired total brake command.

11. The brake system of claim 10, wherein calculation of the cost involves a brake weight term that increases the penalty for the sum of the left brake command and the right brake command deviating from the desired total brake command, wherein the penalty increases when the desired total brake command increases.

12. A method of braking a mobile machine, comprising:
    determining a maximum allowable brake command;
    determining a desired differential brake command;
    calculating an ideal solution of a left brake command and a right brake command to satisfy a combination of the desired differential brake command and a desired total brake command;
    outputting the ideal solution as an actual brake command when the ideal solution is valid; and
    calculating a non-ideal solution of the left brake command and the right brake command when the ideal solution is invalid.

13. The method of claim 12, wherein the ideal solution is valid when the left brake command and the right brake command are less than or equal to the maximum allowable brake command and more than or equal to a minimum brake command.

14. The method of claim 13, wherein the minimum brake command is set by a minimum deadband limit.

15. The method of claim 12, wherein the non-ideal solution is one of eight non-ideal solutions, wherein
    in a first non-ideal solution, the left brake command equals a minimum brake command and the right brake command is calculated;
    in a second non-ideal solution, the right brake command equals the minimum brake command and the left brake command is calculated;
    in a third non-ideal solution, the left brake command equals the maximum allowable brake command and the right brake command is calculated;

in a fourth non-ideal solution, the right brake command equals the maximum allowable brake command and the left brake command is calculated;

in a fifth non-ideal solution, the left brake command equals the minimum brake command and the right brake command equals the minimum brake command;

in a sixth non-ideal solution, the left brake command equals the maximum allowable brake command and the right brake command equals the maximum allowable brake command;

in a seventh non-ideal solution, the left brake command equals the minimum brake command and the right brake command equals the maximum allowable brake command; and in an eighth non-ideal solution, the left brake command equals the maximum allowable brake command and the right brake command equals the minimum brake command.

16. The method of claim 15, further comprising calculating a cost associated with the non-ideal solution.

17. The method of claim 16, wherein calculation of the cost includes calculating a penalty for when a difference in left and right brake commands deviates from the desired differential brake command and calculating a penalty for when a sum of the left brake command and the right brake command deviates from the desired total brake command.

18. The method of claim 17, wherein calculating the cost involves a brake weight term that increases the penalty for the sum of the left brake command and the right brake command deviating from the desired total brake command, wherein the penalty increases when the desired total brake command increases.

19. The method of claim 15 further comprising calculating a cost associated with each of the eight non-ideal solutions.

20. The method of claim 15 further comprising determining whether any of the eight non-ideal solutions are invalid, wherein any of the eight non-ideal solutions are invalid if at least one of the left brake command and the right brake command falls outside of a range set by the minimum brake command and the maximum allowable brake command.

* * * * *